US008916985B2

(12) United States Patent
Oesterheld et al.

(10) Patent No.: US 8,916,985 B2
(45) Date of Patent: Dec. 23, 2014

(54) GAS TURBINE START WITH FREQUENCY CONVERTOR

(71) Applicant: ALSTOM Technology Ltd, Baden (CH)

(72) Inventors: Joerg Oesterheld, Oberrohrdorf (CH); Juergen Hoffmann, Untersiggenthal (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 13/850,340

(22) Filed: Mar. 26, 2013

(65) Prior Publication Data

US 2013/0249213 A1 Sep. 26, 2013

(30) Foreign Application Priority Data

Mar. 26, 2012 (EP) .................................... 12161157

(51) Int. Cl.
| | | |
|---|---|---|
| *H02J 3/40* | (2006.01) | |
| *F01D 19/00* | (2006.01) | |
| *F02C 9/18* | (2006.01) | |
| *F02C 7/26* | (2006.01) | |
| *H02P 9/08* | (2006.01) | |

(52) U.S. Cl.
CPC *H02P 9/08* (2013.01); *F01D 19/00* (2013.01); *F02C 9/18* (2013.01); *F02C 7/26* (2013.01); *F05D 2260/85* (2013.01); *F05D 2220/764* (2013.01); *F05D 2270/061* (2013.01)
USPC ........................................................ 290/52

(58) Field of Classification Search
CPC ....................................................... F02C 6/00
USPC ............................................................ 290/52
See application file for complete search history.

(56) References Cited

U.S. PATENT DOCUMENTS

| | | | | |
|---|---|---|---|---|
| 4,031,407 A | * | 6/1977 | Reed | 307/87 |
| 5,252,860 A | * | 10/1993 | McCarty et al. | 290/40 R |
| 5,635,768 A | * | 6/1997 | Birch et al. | 290/40 C |
| 7,915,868 B1 | * | 3/2011 | Maters et al. | 322/29 |
| 7,944,094 B2 | * | 5/2011 | Hoffmann | 307/151 |

(Continued)

FOREIGN PATENT DOCUMENTS

| | | | |
|---|---|---|---|
| DE | 4204677 C1 | * | 6/1993 |
| DE | 102004016453 A1 | | 3/2004 |

(Continued)

OTHER PUBLICATIONS

FR2977993 Computer Translation.*

(Continued)

*Primary Examiner* — Joseph Waks
(74) *Attorney, Agent, or Firm* — Buchanan Ingersoll & Rooney PC

(57) ABSTRACT

A method for the start of a power plant installation which includes a gas turbine, a generator coupled to the gas turbine, and a frequency converter to feed current into an electrical grid. In accordance with the method, during the start of the gas turbine, the generator is connected to the electrical grid via the frequency converter before the operating rotational speed of the gas turbine is reached, wherein the frequency converter is controlled such that it generates an output current with the grid frequency. A power plant installation can execute the above method.

14 Claims, 7 Drawing Sheets

(56) References Cited

U.S. PATENT DOCUMENTS

| | | | |
|---|---|---|---|
| 2002/0070716 A1 | 6/2002 | Gupta et al. | |
| 2004/0178640 A1 | 9/2004 | Satoh et al. | |
| 2007/0132249 A1* | 6/2007 | Andrew et al. | 290/52 |
| 2010/0019717 A1* | 1/2010 | Bjerknes et al. | 318/723 |

FOREIGN PATENT DOCUMENTS

| | | |
|---|---|---|
| DE | 102004016463 A1 | 3/2004 |
| DE | 102004016464 A1 | 3/2004 |
| EP | 677920 A1 * | 10/1995 |
| EP | 0963035 A2 | 5/1999 |
| EP | 1199794 A2 | 10/2001 |
| EP | 1343247 A2 | 9/2003 |
| EP | 1990520 A2 | 11/2008 |
| EP | 2410154 A2 | 1/2012 |
| FR | 2977993 A1 * | 1/2013 |
| JP | 06288259 A * | 10/1994 |
| JP | 06315298 A * | 11/1994 |
| JP | 2003-155934 | 5/2003 |
| JP | 2013201892 A * | 10/2013 |
| RU | 2216637 C1 * | 11/2003 |
| WO | 2004045058 A1 | 5/2004 |

OTHER PUBLICATIONS

European Patent Search Report, Sep. 10, 2012.
Office action issued from Japanese Patent Office dated Aug. 4, 2014 for JP Application No. 2013-063768.

* cited by examiner

GAS TURBINE START WITH FREQUENCY CONVERTOR

TECHNICAL FIELD

The present invention relates to the field of power plant engineering. It concerns a method for operating a gas turbine installation with electronic frequency conversion between a generator and grid and also to a gas turbine installation for the execution of such a method.

PRIOR ART

Large power plant installations having outputs in the range of more than 100 MW, in which a generator generating current is driven by a turbine and the electrical output generated is fed into a grid with a predefined grid frequency (for example 50 or 60 Hz), usually have a fixed coupling between the (mechanical) rotational speed of the turbine and the grid frequency. Here, the output of the generator is connected to the grid with a fixed frequency via a grid connection and the generator is directly coupled to the gas turbine. In smaller power plant installations the generator is driven by the turbine in a rotational-speed-coupled manner via a mechanical gear unit. Only fixed transmission ratios between a turbine rotational speed and a grid frequency can be implemented by means of gear units.

For the start, gas turbines are typically accelerated by the generator, which is controlled and operated as a motor, until the self-sustaining rotational speed of the gas turbine has been exceeded. Here, the self-sustaining rotational speed of the gas turbine is the minimum rotational speed at which the power output by the turbine is sufficient to keep the gas turbine in operation. The feed of the generator is disconnected above the self-sustaining rotational speed and the generator is electrically separated from the grid. The gas turbine accelerates from its own force until a nominal rotational speed is reached. With large conventional gas turbines, which are coupled directly to the electrical grid by the generator, this rotational speed corresponds to the grid frequency. In gas turbines with a gear unit, the nominal rotational speed corresponds to the grid frequency multiplied by the rotational speed ratio of the gear unit.

Once the nominal rotational speed has been reached, the generator can be synchronized and power can be output to the electrical grid. For synchronization, the gas turbine is typically first brought to a slight overspeed compared to the grid frequency, the rotational speed is then reduced until the deviation in rotational speed and phase shift fall below permissible deviations for synchronization, and the gas turbine is then synchronized. This process is relatively time-consuming and can take approximately a few seconds to minutes.

In addition, the synchronization process leads to unnecessary transients in the hot gas and waste gas temperatures of the turbine. Above the self-sustaining rotational speed, the power that a gas turbine can output increases with the rotational speed. With a constant hot gas temperature, the power increase in the last part of the start process leads to an increasingly quicker acceleration of the gas turbine. In order to adjust the gas turbine to nominal rotational speed, the power output of the turbine has to be reduced, which is achieved by a reduction of the hot gas temperature. After synchronization to the grid, the turbine is typically loaded, for which purpose the hot gas temperature is again raised.

DISCLOSURE OF THE INVENTION

One objective of the present disclosure is to specify a method for the quick start of a gas turbine power plant. Furthermore, transient thermal loads of the turbine are to be reduced. The disclosure also relates to a gas turbine power plant, which is suitable for carrying out the method.

A power plant installation for carrying out the method comprises a gas turbine, a generator coupled to the gas turbine, and a frequency convertor, which is connectable to a grid having a grid frequency for feeding current into the electrical grid.

The start of a gas turbine is to be understood to mean the run-up of the gas turbine from shutdown until synchronization with an electrical grid.

The disclosed method for the start of a power plant installation is characterized in that the generator is connected to the electrical grid via the frequency convertor before the nominal rotational speed of the gas turbine is reached, wherein the frequency convertor is controlled such that it generates an output current with the grid frequency.

Electrical power can thus be output to the electrical grid even before the nominal rotational speed of the gas turbine is reached. This electrical power is preferably output to the electrical grid directly via the step-up transformer.

The nominal rotational speed or the design rotational speed is to be understood to mean the rotational speed at which the gas turbine is operated under load. In large gas turbines, this is typically the grid frequency, that is to say 50 Hz or 60 Hz corresponding to 3000 rpm or 3600 rpm. With the use of frequency convertors, the mechanical nominal frequency or nominal rotational speed of the turbine can deviate by a transfer factor from the synchronous rotational speed to the grid, as is also the case with the use of a gear unit, and therefore nominal rotational speeds of 3000 rpm for the feed into a 60 Hz grid or 3600 rpm for a feed into a 50 Hz grid would be possible for example, although rotational speeds deviating therefrom can also be implemented. For gas turbines of medium power with a frequency convertor, the transfer factor from mechanical frequency to grid frequency is much greater than 1, and is typically in a range from 2 to 5.

In accordance with an embodiment of the method, the generator is already connected to the electrical grid via the frequency convertor at a rotational speed less than 90% of the operating rotational speed of the gas turbine in order to output electrical power to the grid. The operating rotational speed is the speed at which the gas turbine is steady state operated to produce a target power at given ambient conditions. Typically the operating rotational speed at ISO conditions and base load is equal to the nominal speed. The operating rotational speed can be lower than the nominal speed at part load and/or low ambient temperature.

To start the gas turbine, discharge valves of the compressor are typically opened in order to prevent a stall in the compressor at low rotational speeds. These discharge valves may be closed already before the nominal rotational speed is reached, for example between 70% and 90% of the nominal rotational speed. The generator is typically connected to the electrical grid via the frequency convertor once the discharge valves of the gas turbine are closed. In accordance with an embodiment of the method, the generator is connected to the electrical grid via the frequency convertor as soon as the discharge valves of the gas turbine are closed. The self-sustaining rotational speed of a gas turbine is typically between 40% and 60% of the nominal rotational speed. From a rotational speed lying approximately 10% to 20% above the self-sustaining rotational speed, the power of the turbine is much greater than the power required to drive the compressor and overcome frictional losses, etc., and therefore the gas turbine can itself accelerate the shaft train and usable power can be output additionally. In accordance with an embodiment of the method, the generator is connected to the electrical grid via the frequency convertor as soon as the gas turbine has reached a rotational speed between 70% and 85% of the grid frequency.

In accordance with a further embodiment, current is fed into a grid with a grid frequency of 60 Hz via a frequency convertor using a gas turbine that has a nominal rotational speed of 3000 rpm. In particular in this application, the generator is connected to the electrical grid via the frequency convertor as soon as the gas turbine has reached a rotational speed between 70% and 85% of the grid frequency.

In accordance with a further embodiment of the method, the generator is operated as a motor in a first step to start rotation of the gas turbine via a start-up transformer and a static start-up device. In a second step the generator is separated from the static start-up device, and in a third step is connected to the grid via the frequency convertor to output electrical power.

In accordance with an embodiment of the method, the generator is operated as a motor to start rotation of the gas turbine until the self-sustaining rotational speed of the gas turbine is exceeded.

In a further embodiment, the generator is supplied with current from the grid via the frequency convertor and is operated as a motor to start rotation of the gas turbine until the gas turbine power exceeds the power necessary for acceleration of the shaft train (i.e. above the self-sustaining speed, typically 5% to 10% or 2% to 20% above the self-sustaining speed). As soon as the gas turbine power exceeds the power necessary for acceleration of the shaft train, electrical power is output to the grid via the same frequency convertor.

In an alternative embodiment of the method, the generator is supplied with current from the grid via the frequency convertor and is operated as a motor to start rotation of the gas turbine until the gas turbine power exceeds the power necessary for acceleration of the shaft train. As soon as the gas turbine power exceeds the power necessary for acceleration of the shaft train plus a threshold value, electrical power is output to the grid via the frequency convertor. For example, the threshold value is the minimum power of the power plant installation. A minimum power is defined in order to ensure a feed of electrical power into the grid and to prevent power return flow into the generator. For example, the minimum power is approximately from half a percent to two percent of the nominal power of the generator.

The rotational speed gradient of the gas turbine is typically controlled to a maximum value during the start process at run-up as soon as the excess power is large enough in order to implement this maximum rotational speed gradient. This maximum rotational speed gradient is typically dependent on the rotational speed and is small before the nominal rotational speed is reached in order to prevent a strong overshoot of the rotational speed above the nominal rotational speed and in order to facilitate a stable adjustment to the nominal rotational speed. Here, the rotational speed gradient is typically controlled by the hot gas temperature. In order to prevent excessive acceleration before the nominal rotational speed is reached, the hot gas temperature has to be considerably reduced. In order to prevent the associated thermal loads of the gas turbine and a delay of the loading of the gas turbine, the acceleration of the gas turbine in accordance with an embodiment of the method is controlled via the power output to the grid as soon as the generator outputs electrical power to the grid via the frequency convertor, whereby an adjustment to nominal rotational speed without significant fluctuations of the hot gas temperature is possible.

The proposed method allows an acceleration of the gas turbine from synchronization, in which the turbine outlet temperature is controlled in accordance with a predefined curve and the acceleration is controlled by the output power. The predefined outlet temperature may be a constant turbine outlet temperature for example or may be given in accordance with the rotational speed.

In accordance with an embodiment of the method, the turbine outlet temperature is kept constant once the nominal rotational speed is reached, and the rotational speed of the gas turbine is controlled to the nominal rotational speed of the gas turbine by controlling the output power. The control of the output power is typically a power increase in order to prevent a further rise of the rotational speed.

In order to ensure a stable power output and control, the frequency convertor in accordance with an embodiment of the method is controlled such that the generator, from the moment at which it is connected to the grid, outputs to the grid an electrical power that is at least one percent (1%) of the nominal power of the gas turbine.

Besides the method, the disclosure relates to a power plant installation for the execution of the method. A power plant installation of this type comprises a gas turbine with a discharge valve for blowing out air from the compressor when starting up the gas turbine, a generator coupled to the gas turbine, and a frequency convertor, which is connectable to an electrical grid. The power plant installation is characterized in that the frequency convertor comprises a controller, which, during the start of the power plant installation once the discharge valve has been closed and before the nominal rotational speed of the gas turbine is reached, controls the frequency convertor such that it generates an output current with the grid frequency. This allows the generator to connect to the electrical grid and to output power to the grid before the gas turbine has reached its nominal rotational speed.

In accordance with an embodiment, the frequency convertor can be connected to the grid via a step-up transformer. In accordance with a further embodiment, the frequency convertor can be supplied with power from the grid via the step-up transformer, which is used when operated under load to transfer power to the electrical grid, in order to control the generator as a motor.

In accordance with a further embodiment, a starting transformer is arranged between the frequency convertor and the grid and transforms the current from the grid to a starting voltage, which is lower than the voltage during operation under load of the generator. Starting from an alternating current with grid frequency and the starting voltage, the generator is controlled by the frequency convertor as a motor. In particular, the frequency convertor can be selectively connected to the grid via the step-up transformer for operation under load or via the starting transformer for the start.

In accordance with a preferred embodiment, a generator circuit breaker, a step-up transformer and a grid high-voltage transformer are arranged between the frequency convertor and the grid in order to output power to the grid, and a starting transformer and a start-up switch are arranged parallel to the generator circuit breaker for power consumption. To start the gas turbine, electrical power can thus be conducted from the grid to the frequency convertor via the generator circuit breaker, the step-up transformer, the starting transformer and the start-up switch.

BRIEF EXPLANATION OF THE FIGURES

The invention will be explained in greater detail hereinafter for exemplary embodiments on the basis of the drawing, in which.

EMBODIMENTS OF THE INVENTION

Figure 1:
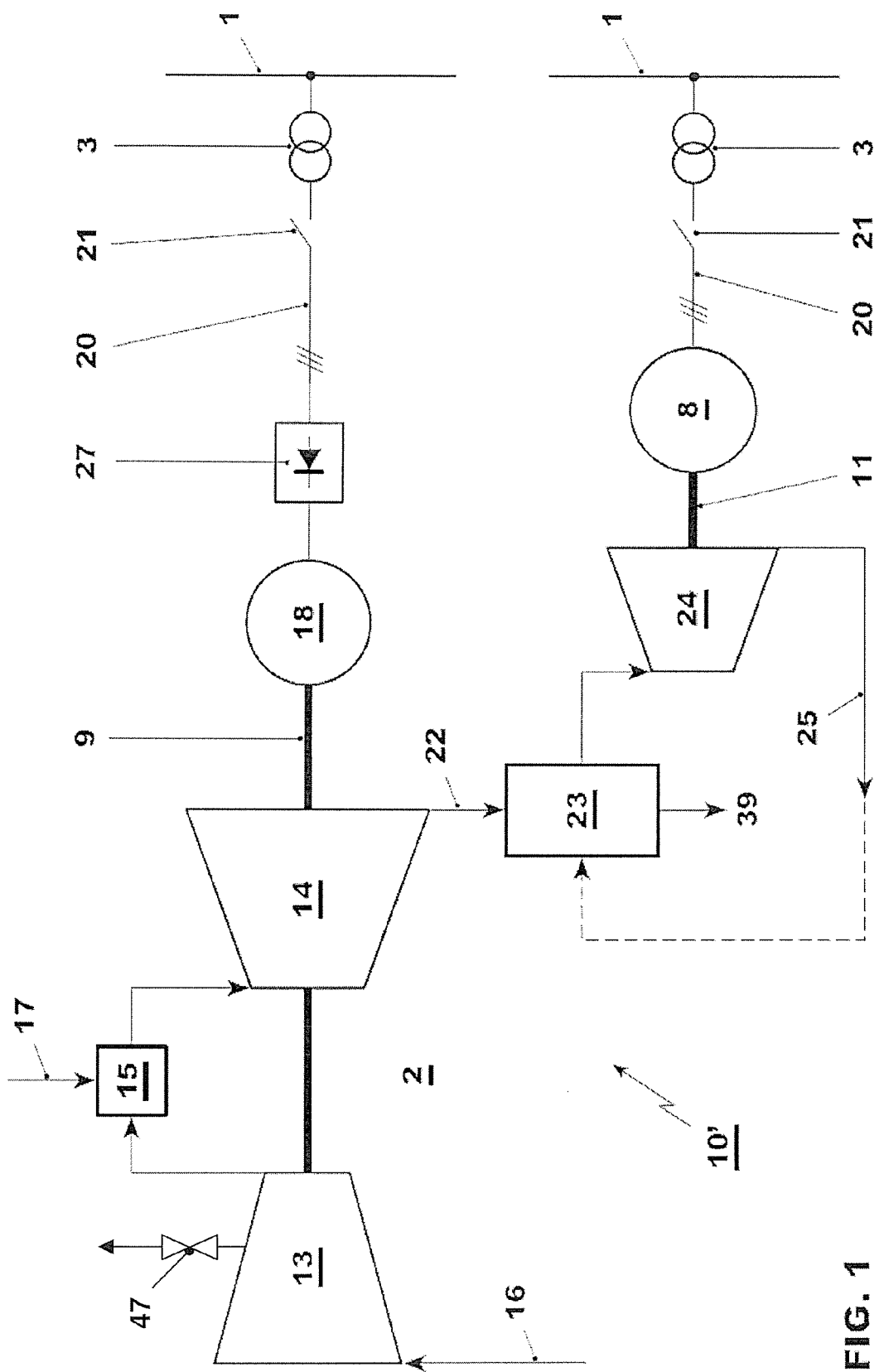
FIG. 1 shows a highly simplified schematic diagram of a combined cycle gas turbine plant with a gas turbine, a generator with frequency convertor, and a downstream water/steam circuit.

FIG. 1 shows a highly simplified illustration of a power plant installation 10, which generates current by means of a gas turbine 2 with coupled first generator 18 and a steam turbine 24 with coupled second generator 8 and feeds the current into a grid 1. The gas turbine 2 and the generator 18 are connected by a common shaft and form a shaft train 9. In the simplest case, the gas turbine 2 comprises a compressor 13, which draws in and compresses combustion air via an air inlet 16. The compressor 13 can be composed from a plurality of sub-compressors connected in succession, which operate at an increasing pressure level and enable intermediate cooling of the compressed air where necessary. The combustion air compressed in the compressor 13 reaches a combustion chamber 15, into which liquid fuel (for example oil) or gaseous fuel (for example natural gas) is injected via a fuel supply 17 and is burned with consumption of combustion air. The gas turbine also has a discharge valve 47, via which air is blown out from at least one intermediate stage of the compressor 13 during the start of the gas turbine, typically up to a rotational speed between 70% and 90% of the nominal rotational speed of the gas turbine, in order to prevent a stall due to the low speed in the compressor 13. For example, the air is blown off into the surrounding environment or via a line (not shown) into the exhaust gas lines of the gas turbine.

The hot gases escaping from the combustion chamber 15 are work-expanded in a subsequent turbine 14 and thus drive the compressor 13 and the coupled first generator 18. The waste gas, which is still relatively hot upon exit from the turbine, is sent through a subsequent waste heat steam generator 23 in order to generate steam in a separate water/steam circuit 25 for the operation of a steam turbine 24. A condenser, feed-water pump and further systems of the water/steam circuit 25 are not shown in order to simplify the illustration. Such a combination of gas turbine power plant and steam power plant is referred to as a combined cycle power plant. Here, the steam turbine 24 can be coupled to the first generator 18 on the side opposite the turbine 14. The gas turbine 2, first generator 18 and steam turbine 24 then form what is known as a single shaft power train. The steam turbine 24 may however also drive its own second generator 8 on a separate shaft train 11, as shown in FIG. 1. Various combinations are known for multi-shaft installations. For example, what are known as 2-in-1 arrangements, in which a steam turbine 24 on a shaft train 11 with a second generator 8 is supplied with steam by two waste heat steam generators 23 arranged downstream of two gas turbines 2, are widespread. Here, the gas turbines 2 are each arranged on a shaft train 9 with their own first generator 18. Similarly, there are also arrangements in which the steam is used by three or more waste heat steam generators 23 arranged downstream of gas turbines 2 in order to drive a steam turbine 24.

With the 1-shaft gas turbine in FIG. 1, the rotational speed of the gas turbine 2 has a fixed ratio to the frequency of the alternating voltage generated in the first generator 18. In order to be able to operate the gas turbine 2 independently of the grid frequency, the generator is connected to the grid 1 via a frequency convertor 27. Since the grid voltage is typically higher than the generator voltage, a step-up transformer may also be provided between the frequency convertor 27 and the grid 1. The frequency convertor 27 allows the gas turbine 2 or the generator 18 to connect to the grid 1 even before reaching its nominal rotational speed and to feed electrical power into the grid 1 via the step-up transformer 3. With corresponding connection, the frequency convertor 27 can also be used to operate the generator 18 as a motor for the start of the gas turbine 2.

Figure 2:
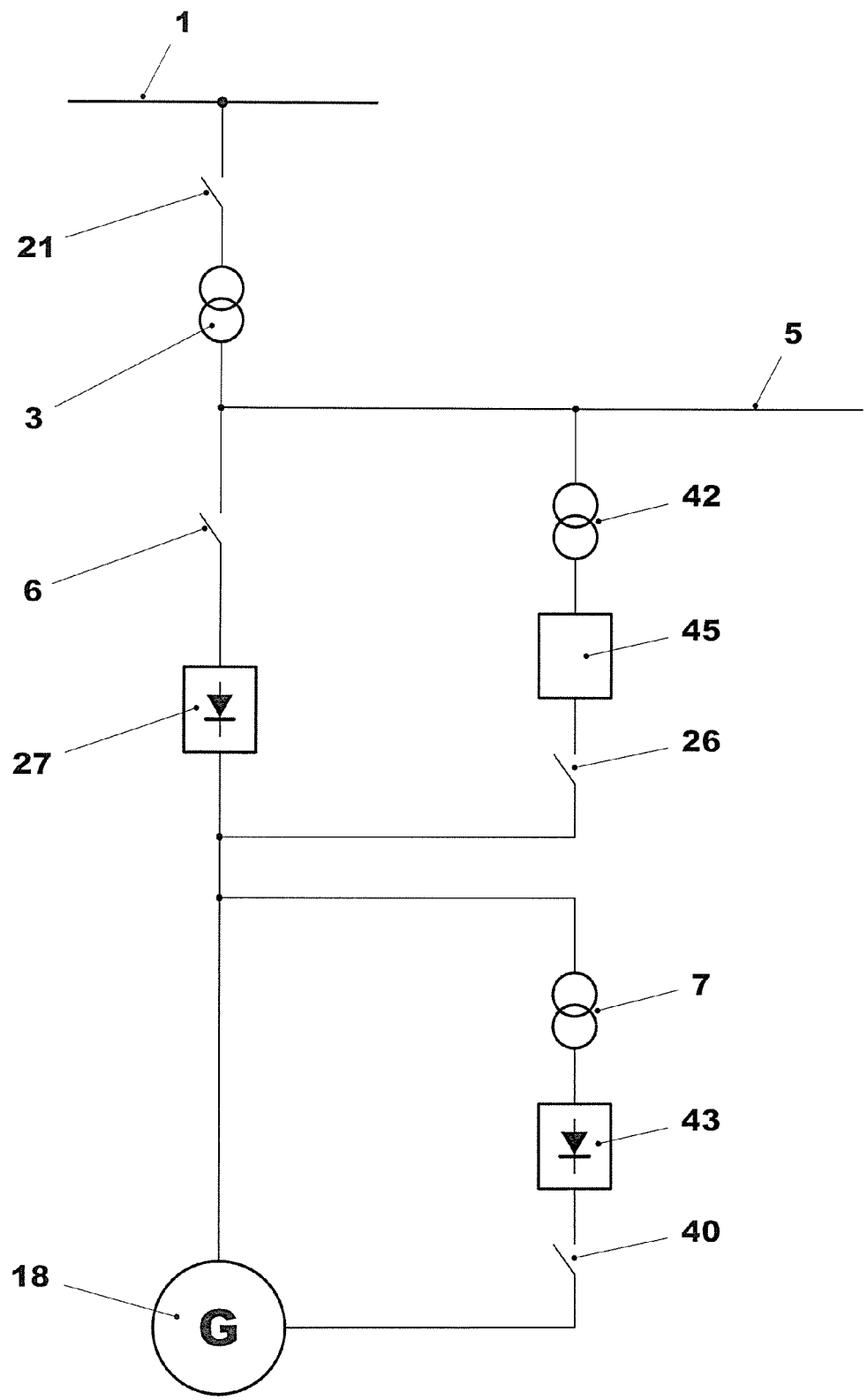
FIG. 2 shows a highly simplified detail of a single line diagram in accordance with an exemplary embodiment of the invention with frequency convertor and static start-up device.

A highly simplified detail from a single line diagram of a first embodiment of the power plant according to the invention is illustrated in FIG. 2. This allows a feed of electrical power into the grid 1 before the gas turbine has reached the nominal rotational speed. It shows a conventional generator 18 driven by at least one turbine, the output power of said generator being transferred via a power plant grid 5. The power plant grid 5 contains high-voltage lines and a generator circuit breaker 6 with which the generator 18 can be separated from the power plant grid 5. The current generated by the generator 18 is fed into the grid 1 via a grid connection 20, a step-up transformer 3 and a grid high-voltage switch 21. The power grid that belongs to the power plant and consists of a medium-voltage grid and a low-voltage grid supplied thereby is typically supplied from the power plant grid 5 via an auxiliary transformer and a high-voltage switch (not shown).

The generator excitation current is drawn off from the power plant grid 5, transformed to excitation voltage via an excitation transformer 7 and is rectified and controlled in a static exciter 43. The excitation can be activated or deactivated by an excitation switch 40.

In order to switch the generator 18 as a motor for the start of the gas turbine, the generator 18 is supplied with current from the power plant grid 5 via a start-up transformer 42 and via a static start-up device (static frequency convertor) 45. The static start-up device 45 can be connected to the generator 18 or separated therefrom via a start-up switch 26.

During normal operation, the frequency of the current generated by the generator 18 is converted in the frequency convertor 27 to the grid frequency. This allows more flexible operation of the gas turbine. In particular, the frequency convertor allows an electrical connection of the generator 18 to the grid 1 before the generator 18 has reached its operating rotational speed. This can occur as soon as the gas turbine 2 has exceeded its self-sustaining rotational speed, the start-up switch 26 has been opened and the exciter of the generator 18 has been switched on via the excitation switch 40. The excitation voltage is typically lower than that of the power plant grid 5, which is why an excitation transformer 7 can be provided for power supply of the static exciter 43.

Figure 3:
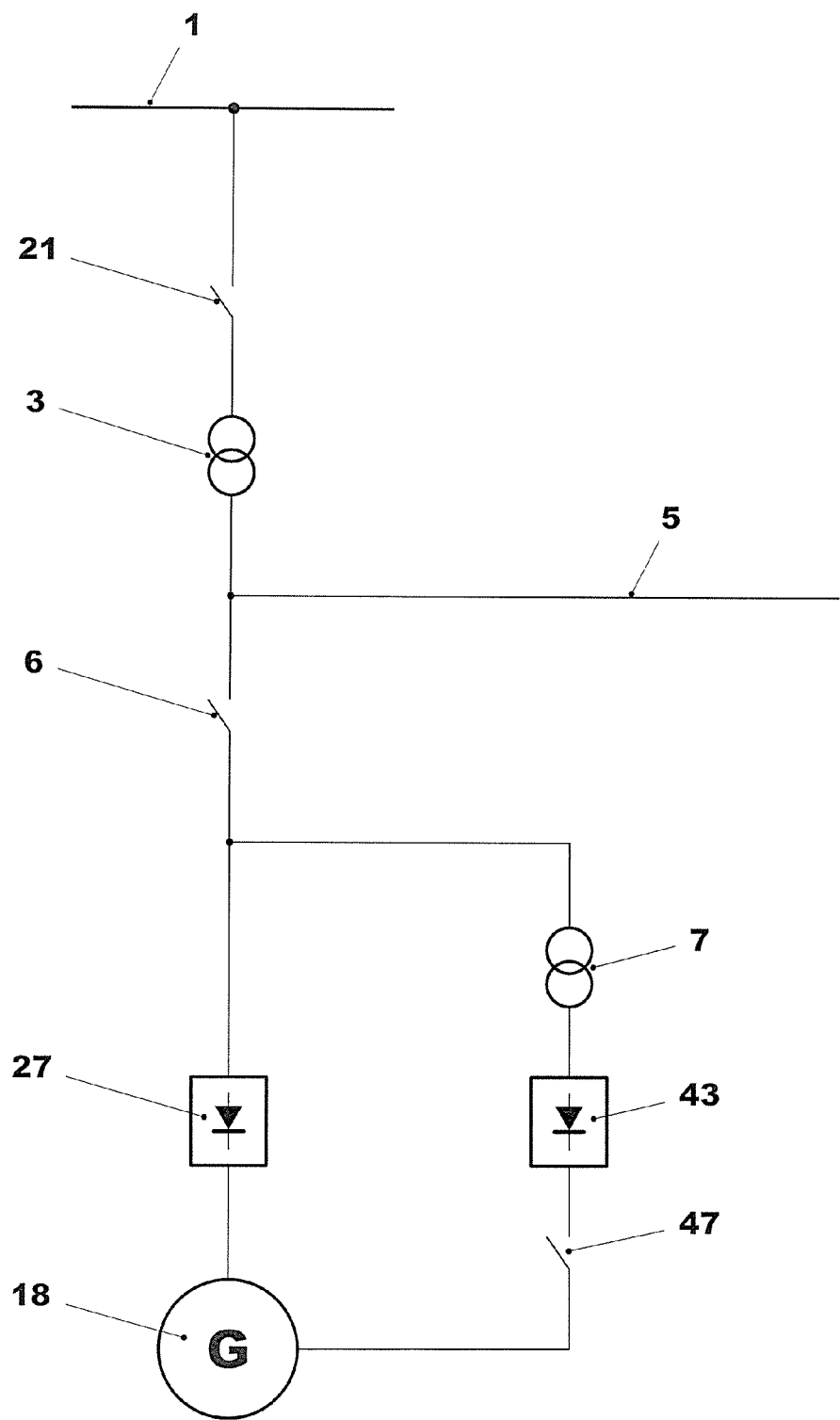
FIG. 3 shows a highly simplified detail of a single line diagram of a power plant installation in accordance with an exemplary embodiment of the invention with frequency convertor for current feed into the grid and for control of the generator as a motor.

A second embodiment of the power plant according to the invention is illustrated in FIG. 3. The exemplary embodiment shown in FIG. 3 is based on that of FIG. 2. In this embodiment, a static start-up device 45 for the start of the gas turbine 2 has been omitted however. For the start, the frequency convertor 27 is used to control the generator 18 as a motor. To this end, the frequency convertor 27 in this embodiment is supplied with current from the grid 1 directly by the step-up transformer 3 during motor operation of the generator 18.

Figure 4:
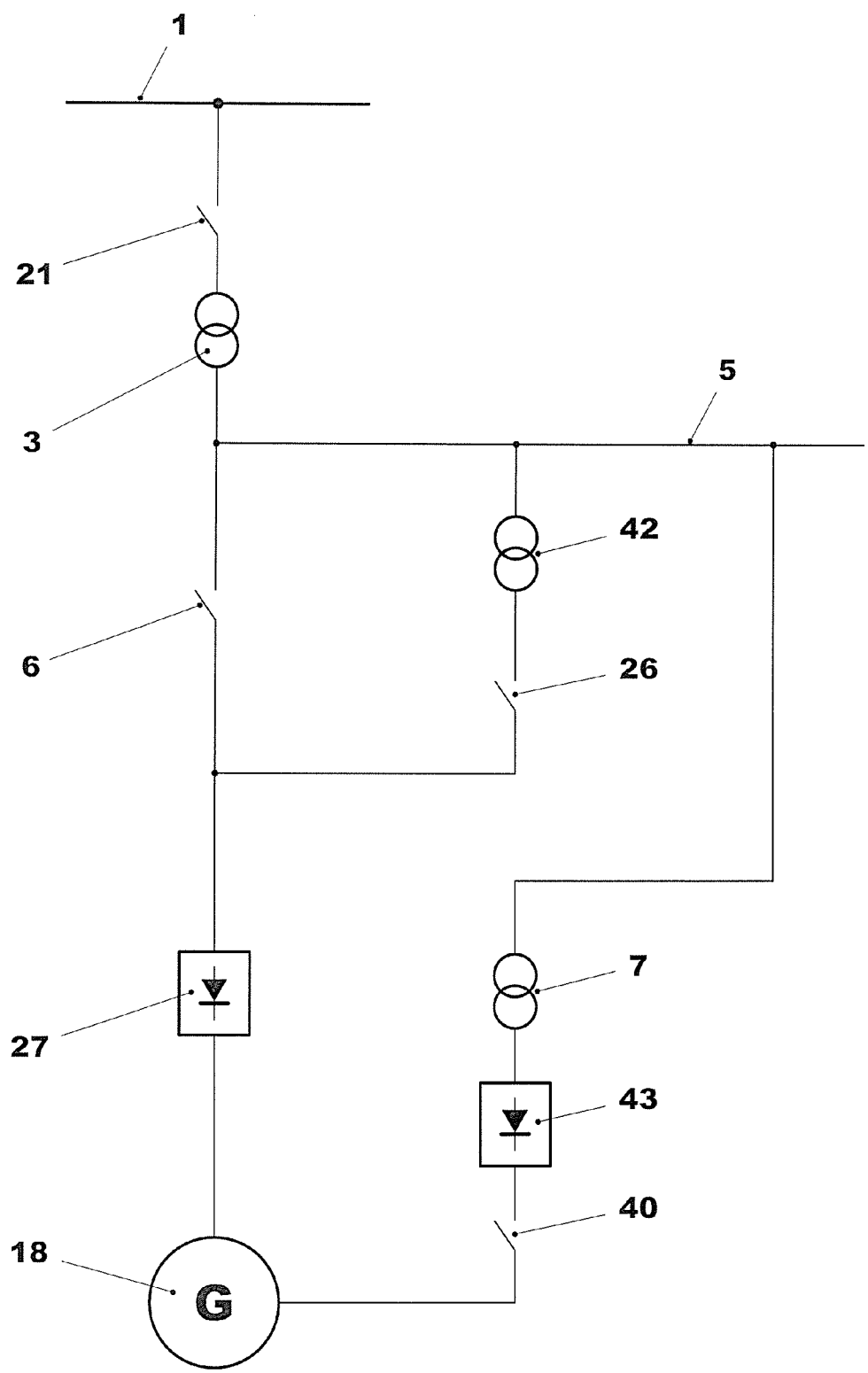
FIG. 4 shows a highly simplified detail of a single line diagram of a power plant installation in accordance with an exemplary embodiment of the invention with two transformers between the frequency convertor and the grid.

A further embodiment of the power plant according to the invention is illustrated in FIG. 4. Depending on the design of the frequency convertor 27 and voltage before the step-up transformer 3, the frequency convertor 27 cannot be used directly to control the generator 18 as a motor. In order to supply the frequency convertor 27 with current at a lower voltage level for the start, a start-up transformer 42 (also called a starting transformer) and a start-up switch 26 are provided in this embodiment. The grid high-voltage switch 21 is closed during the start. The frequency convertor 27 is supplied with current of a suitable voltage via the step-up transformer 3 and the start-up transformer 42 in order to operate the generator 18 as a motor. As soon as generator/motor power is no longer required to start rotation of the gas turbine, the start-up switch 26 can be closed. Then, when the necessary clearance is reached, the generator 18 is excited and electrical power can be output to the grid 1 via the frequency convertor 27, the generator switch 6, the step-up transformer 3 and the grid high-voltage switch 21.

Figure 5:
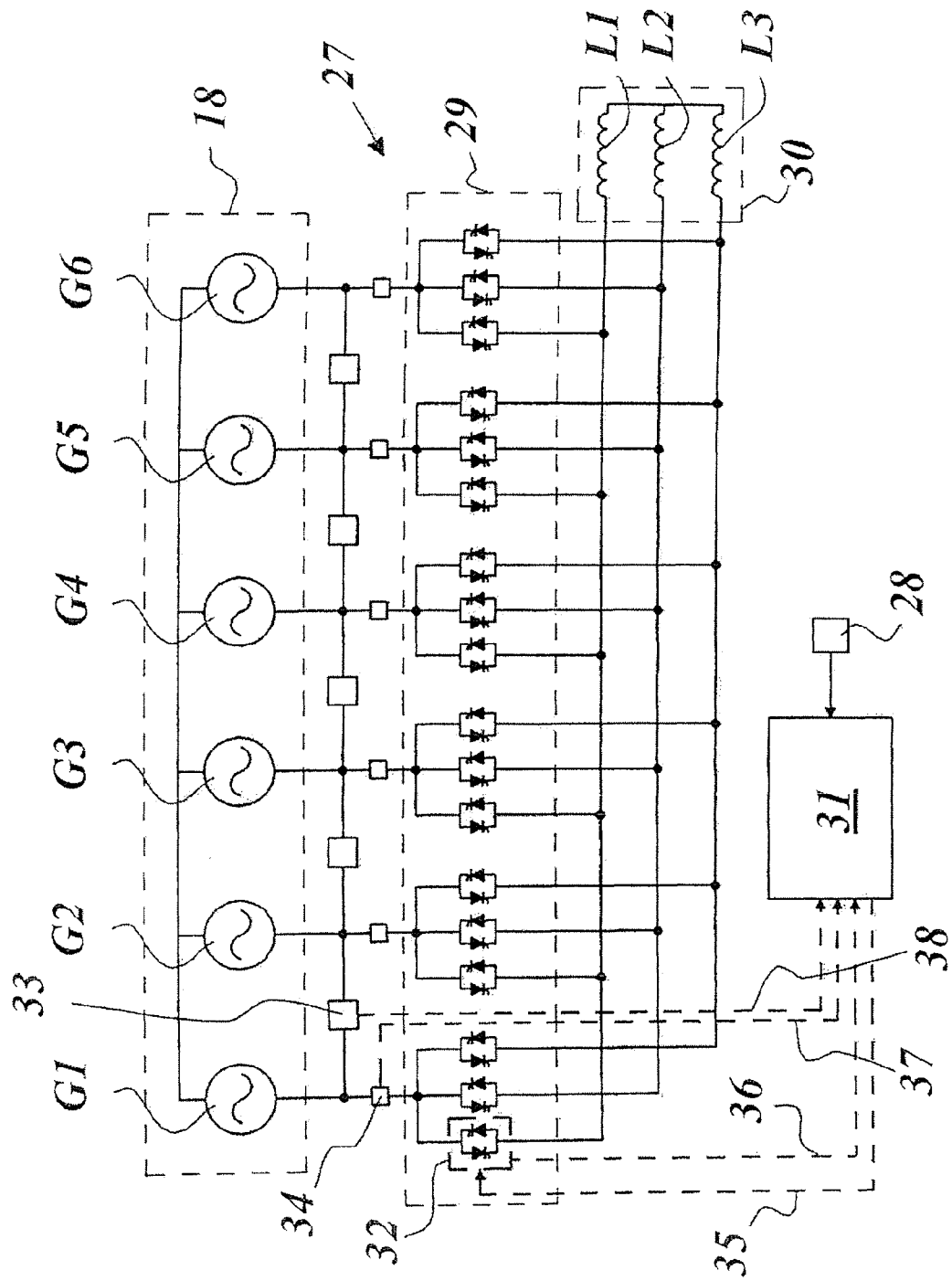
FIG. 5 shows the exemplary structure of a matrix convertor, as can be used as an electronic frequency convertor in an installation according to one of FIGS. 1 to 4.

Various types of frequency convertors 27 are known. An exemplary structure of a matrix convertor, as can be used as an electronic frequency convertor 27 in an installation according to FIGS. 1 to 4, is shown in FIG. 5.

The electronic frequency convertor 27 is preferably formed as a matrix convertor without DC link in order to delimit the power loss. The structure and operating principle of such a matrix convertor, which operates with particularly low loss on account of its control, have been described in EP-A2-1 199 794. Further embodiments of such a matrix convertor have been disclosed in EP-A1-1 561 273, in DE-A1-10 2004 016 453, DE-A1-10 2004 016 463 and DE-A1-10 2004 016 464. The basic schematic diagram of a matrix convertor with 6 input phases and 3 output phases is illustrated in FIG. 5. The matrix convertor 27 connects, in chronological sequence, 6 phases G1, . . . , G6 of a generator 8, 18 as a source to three phases L1, . . . , L3 of a load 30. The power element 29 required for this comprises 18 bidirectional switches 32 in the form of antiparallel-connected thyristors (there are generally m×n switches for m input/source phases and n output/load phases). The switches 32 are arranged in a (6×3) matrix. For the control of the switches 32, a control unit or a controller 31 is provided, which receives time signals (a clock frequency) from a clock generator 28. The switching status of each of the switches 32 (ON, OFF) is monitored and signaled to the controller 31 via a first signal line 36. The switches 32 are each controlled by the controller 31 via a control line 35.

An ammeter 34 is arranged in each of the individual phases G1, . . . , G6 of the generator 8, 18 and signals the polarity sign of the phase current to the controller 31 via a second signal line 37. Furthermore, voltmeters 33 are arranged between the phases G1, . . . , G6 of the generator 8, 18 and signal the polarity sign of the respective phase difference voltage to the controller 31 via a third signal line 38. Reference is made to the above-cited documents with regard to the details of the operating sequence of the matrix convertor.

Other frequency convertor types are also suitable for the application according to the invention, wherein a high degree of efficiency of the frequency convertor is advantageous for the application.

In the examples shown, the frequency convertor is illustrated as a device separate from the generator. Alternatively, the frequency convertor can also be integrated into the generator, or the frequency convertor can set/control the output frequency of the generator 18 by a controlled rotary field/excitation frequency of the rotor windings.

Figure 6:
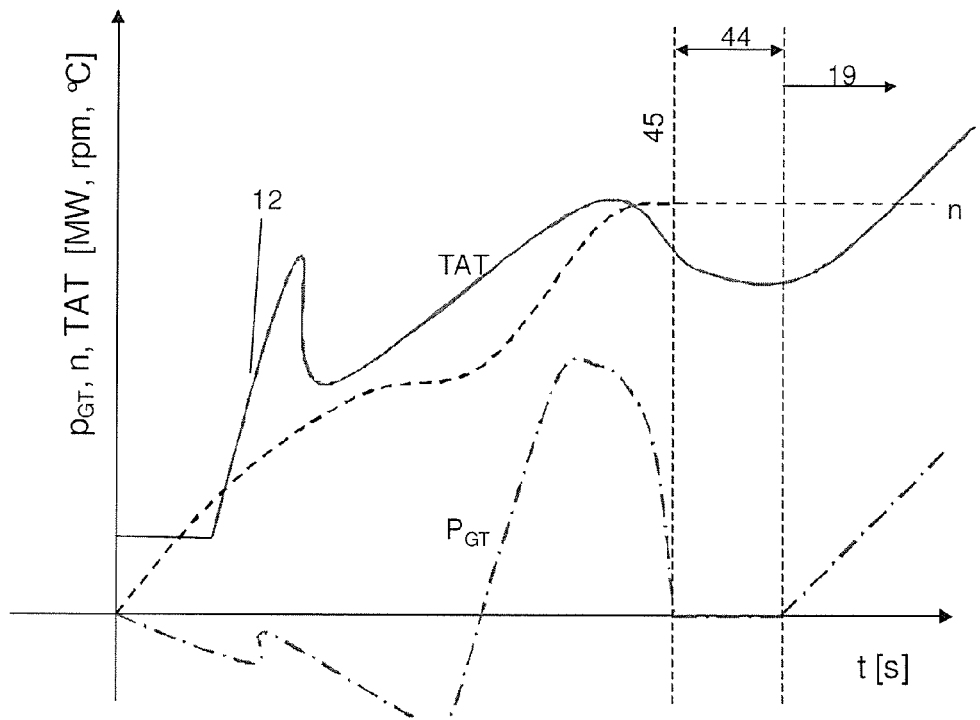
FIG. 6 shows an example of the progression of key process variables during a gas turbine start.

FIG. 6 shows an example of the progression of key process variables during a gas turbine start without a frequency convertor 27. To illustrate the start, the rotational speed n, the turbine outlet temperature TAT and the power of the gas turbine PGT are illustrated over time. During the run-up process until nominal rotational speed is reached, the sum of net generator power and the acceleration power of the shaft train 9 forms the power of the gas turbine PGT. Here, a negative net generator power is the power that the generator outputs during motor operation. As the rotation of the gas turbine starts from shutdown, that is to say from a rotational speed n equal to 0 rpm, acceleration power is initially equal to the power of the generator 18 operated as a motor and excited via a separate starting exciter where necessary. With increasing rotational speed, the power consumption of the compressor becomes greater, as a result of which the acceleration is reduced and the power of the gas turbine PGT falls. As soon as the ignition 12 in the combustion chamber 15 occurs, the turbine outlet temperature TAT rises sharply until the TAT control stabilizes the fuel supply and the gas turbine is accelerated more strongly. The power of the gas turbine PGT therefore rises for a short period before it falls further. Once the self-sustaining rotational speed has been exceeded and once the discharge valves have been closed, the power of the gas turbine PGT rises sharply. The static start-up device 45 can typically be switched off from 60% to 80% of the nominal rotational speed of the gas turbine 2, and the gas turbine accelerates further alone, without the drive of the generator. In order to ensure a stable adjustment of the rotational speed n to nominal rotational speed, the gradient of the rotational speed (acceleration) is typically delimited. A rotational speed controller intervenes and the turbine outlet temperature TAT is reduced. As soon as the nominal rotational speed is reached, the rotational speed n is stabilized and the generator 18 can be synchronized. Only after this relatively time-consuming stabilization and synchronization 44 can the loading 19 of the gas turbine be started, for which purpose the turbine outlet temperature TAT is raised. From synchronization 44, the gas turbine 2 is operated at constant rotational speed n and the gas turbine power PGT is equal to the power of the generator 18.

For synchronization 44, the gas turbine 2 is brought for example to a slight (that is to say up to 1 or 2% at most) overspeed compared to the grid 1 (not illustrated in FIG. 6 due to the scale), and a synchronization device takes over the control of the gas turbine 2 until the frequency of the generator 18 is in-phase with the frequency of the grid 1. As soon as the frequency and voltage of the generator 18 correspond to those of the grid 1, it gives the command to close the generator switch 6. A negative power is to be avoided during this process because the generator 18 is otherwise immediately separated automatically from the grid 1.

The turbine outlet temperature TAT is equivalent for the hot gas temperature. Both are typically controlled via a fuel supply 17. In order to stabilize the gas turbine 2 at nominal rotational speed, the gas turbine power PGT has to be considerably reduced compared to the acceleration phase. For this purpose, the current turbine outlet temperature TAT and therefore also the hot gas temperature is to be reduced. For a quick start, the turbine outlet temperature TAT is to be selected as high as possible. The reduction of the turbine outlet temperature TAT for stabilization of the rotational speed n and subsequent raising of the turbine outlet temperature TAT during loading 19 of the gas turbine 2 leads to transient temperature changes and can result in an additional consumption of service life due to the associated thermovoltages.

Figure 7:
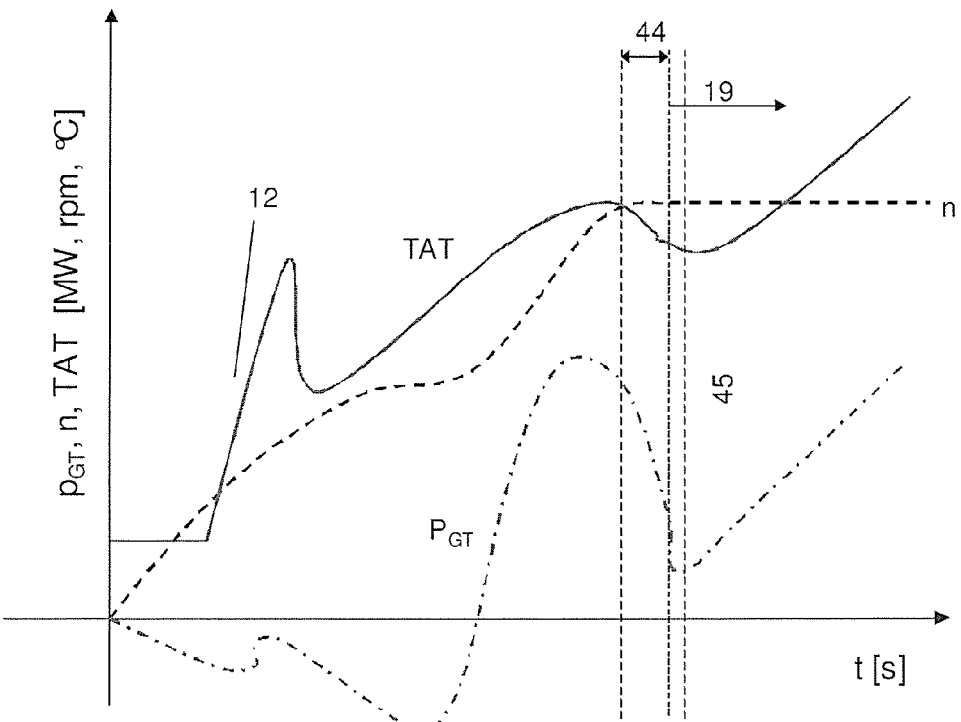
FIG. 7 shows an example of the progression of key process variables with a gas turbine start according to the invention.

FIG. 7 shows an exemplary progression of the key process variables from FIG. 6 for an embodiment of the method according to the invention. The start runs until just before the nominal rotational speed of the gas turbine 2 is reached, identically to the start shown in FIG. 6. As soon as the static start-up device 45 is switched off between 60% to 80% of the nominal rotational speed of the gas turbine 2, the static exciter 43 of the generator 18 can be switched on. The generator 18 can be connected synchronously to the grid via the frequency convertor 27 even before the nominal rotational speed is reached. Conventional synchronization is not necessary. With the frequency convertor switched on, the turbine enters power control. For example, it can be controlled with a minimum power as a target value for further acceleration until nominal rotational speed. The control of the frequency convertor takes over the rotational speed control of the turbine. The adjustment to nominal rotational speed of the gas turbine 2 is achieved via this control. This is controlled such that the positive power of the gas turbine PGT used previously for acceleration is output to the grid 1, that is to say the acceleration is "slowed down" so to speak when the nominal rotational speed is reached. Loading can take place directly thereafter.

Since the gas turbine does not first have to run through an idling phase for synchronization 44, but outputs power directly to the grid 1, the turbine outlet temperature TAT can be held at a higher level. Ideally, transient changes to the turbine outlet temperature TAT during synchronization 44 can be dispensed with completely.

Figure 8:
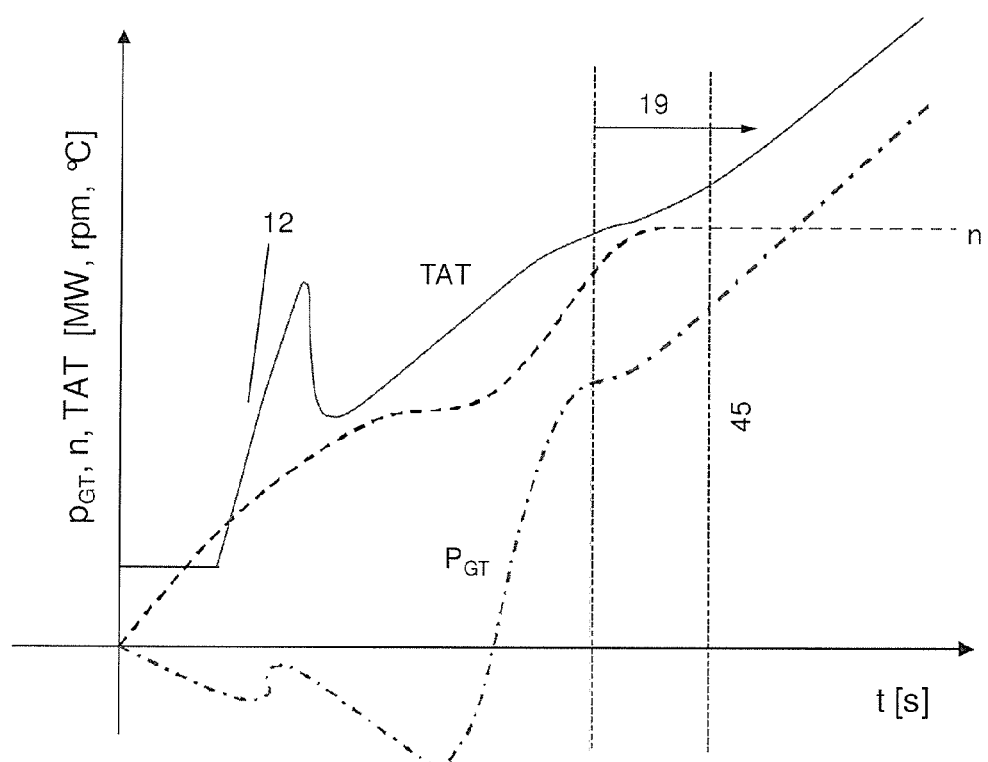
FIG. 8 shows an example of the progression of key process variables with a gas turbine start according to the invention without separation of the frequency convertor from the start of rotation of the gas turbine.

FIG. 8 shows an exemplary progression of the key process variables for a further embodiment of the method according to the invention. In this example, the gas turbine start occurs without separation of the frequency convertor 27 from the grid 1 after initial rotation of the gas turbine 2. The gas turbine 2 is made to rotate by the generator 18 controlled as a motor by the frequency convertor 27. To this end, the generator switch 6 is closed from shutdown. With the gas turbine start according to the invention without separation of the frequency convertor, the generator switch 6 remains closed from initial rotation of the gas turbine. As soon as the gas turbine generates sufficient power for acceleration of the shaft train, the control of the frequency convertor can be controlled such that the generator no longer outputs power. With increasing rotational speed n, the frequency convertor 27 is controlled such that power is output to the grid. Here, loading 19 starts already before the nominal rotational speed of the gas turbine 2 is reached. The gas turbine rotational speed n is controlled via the increasing power output such that it stabilizes at the nominal rotational speed. A transient reduction of the turbine outlet temperature TAT can thus be avoided completely. With increasing power, a further rise in the turbine outlet temperature TAT is shown. This corresponds to improved cooling with increasing pressure conditions.

The possible embodiments of the invention are not limited to the examples illustrated here. On the basis of the examples, a person skilled in the art is provided with a large number of possibilities for producing equivalent circuits and methods. A large number of combinations are possible in particular with regard to the arrangement of switches, transformers and lines. For simplification, safety switches and a large part of the auxiliary systems are also not illustrated. Furthermore, the application is not limited to the type or combination shown here. In particular, the application is not limited to the use in combined cycle power plants. An application for pure gas turbine power plants is also possible. Furthermore, the application is not limited to gas turbines with a single combustion chamber, as is shown in FIG. 1, but can also be applied without limitation for gas turbines with sequential combustion, as are known for example from EP0718470.

In the given examples, a boiler rinsing of the waste heat steam generator 23 is not shown. This is necessary for installations with a waste heat steam generator 23, typically before ignition of the gas turbine. For this purpose, the gas turbine is brought to a rinse rotational speed and is flushed with fresh air until it is ensured that all explosive fuel mixtures have been rinsed from the waste heat steam generator 23. As soon as this is the case, the gas turbine is started up as described.

Furthermore, the rotational speed of the steam turbine 24 can also be controlled with use of an electronic frequency convertor independently of the grid frequency of the grid 1 and, in this case, the self-start of the steam turbine can also be assisted by the provided frequency convertor with the generator in motor operation.

The invention claimed is:

1. A method for the start of a power plant installation comprising a gas turbine, a generator coupled to the gas turbine, and a frequency convertor, which is connectable to an electrical grid to feed current with a grid frequency, wherein during a start of the gas turbine, the frequency convertor is controlled before the nominal rotational speed of the gas turbine is reached, such that it generates an output current with the grid frequency and the generator is connected to the electrical grid via the frequency convertor, and before the nominal rotational speed of the gas turbine is reached, controlling acceleration of the gas turbine via power outputted to the electrical grid as soon as the generator outputs electrical power to the electrical grid via the frequency convertor.

2. The method for the start of a power plant installation as claimed in claim 1, wherein the generator is connected to the electrical grid via the frequency convertor at a rotational speed less than 90% of the operating rotational speed of the gas turbine.

3. The method for the start of a power plant installation as claimed in claim 1, wherein the generator is connected to the electrical grid via the frequency convertor as soon as the gas turbine has reached a rotational speed between 70% and 85% of the grid frequency.

4. The method for the start of a power plant installation as claimed in claim 1, wherein the generator is connected to the electrical grid via the frequency convertor as soon as discharge valves of the gas turbine are closed.

5. The method for the start of a power plant installation as claimed in claim 1, wherein the generator is operated as a motor to start rotation of the gas turbine until the self-sustaining rotational speed of the gas turbine is exceeded.

6. The method for the start of a power plant installation as claimed in claim 5, wherein the generator is initially operated as a motor to start rotation of the gas turbine via a start-up transformer and a static start-up device, the generator is separated from the static start-up device, and the generator is then connected via the frequency convertor for the output of electrical power to the grid.

7. The method for the start of a power plant installation as claimed in claim 5, wherein the generator is supplied with current from the grid via the frequency convertor and is operated as a motor to start rotation of the gas turbine until the gas turbine power exceeds the power necessary for acceleration of the shaft train, and, once the gas turbine power exceeds the power necessary for acceleration of the shaft train, electrical power is output to the grid via the frequency convertor.

8. The method for the start of a power plant installation as claimed in claim 5, wherein the generator is supplied with current from the grid via the frequency convertor and is operated as a motor for initial rotation of the gas turbine until the gas turbine power exceeds the power necessary for acceleration of the shaft train, and, as soon as the gas turbine power exceeds the power necessary for acceleration of the shaft train plus a threshold value, electrical power is output to the grid via the frequency convertor.

9. The method for the start of a power plant installation as claimed in claim 1, wherein the acceleration of the gas turbine is controlled by controlling the power output to the grid as soon as the generator outputs electrical power to the grid via the frequency convertor.

10. The method for the start of a power plant installation as claimed in claim 1, wherein the frequency convertor is controlled such that the generator, from the moment at which it is connected to the grid, outputs to the grid an electrical power greater than or equal to one percent of the nominal power of the gas turbine.

11. The method for the start of a power plant installation as claimed in claim 1, wherein the turbine outlet temperature is kept constant when the nominal rotational speed is reached, and the rotational speed of the gas turbine is controlled by increasing the output power to the nominal rotational speed of the gas turbine.

12. A power plant installation comprising:
a gas turbine with a discharge valve for blowing out air from a compressor when starting up the gas turbine,
a generator coupled to the gas turbine, and
a frequency convertor, which is connectable to an electrical grid,
wherein the frequency convertor comprises a controller, which, during the start of the power plant installation once the discharge valve has been closed and before the nominal rotational speed of the gas turbine is reached, controls the frequency convertor such that it generates an output current with the grid frequency in order to connect the generator to the electrical grid, and controls, before the nominal rotational speed of the gas turbine is reached, acceleration of the gas turbine via power outputted to the electrical grid as soon as the generator outputs electrical power to the electrical grid via the frequency convertor.

13. The power plant installation as claimed in claim 12, wherein a step-up transformer is arranged between the frequency convertor and the grid.

14. The power plant installation as claimed in claim 12, wherein a generator circuit breaker, a step-up transformer and a grid high-voltage transformer are arranged between the frequency convertor and the grid in order to output power to the grid, and a starting transformer and a start-up switch are arranged parallel to the generator circuit breaker for power consumption for the start of the gas turbine.

* * * * *